(12) United States Patent
Singh et al.

(10) Patent No.: US 6,726,360 B2
(45) Date of Patent: Apr. 27, 2004

(54) INTENSITY MODULATED FIBER OPTIC TEMPERATURE SWITCHING IMMERSION PROBE

(75) Inventors: Nahar Singh, Chandigarh (IN); Subhash Chander Jain, Chandigarh (IN); Anil Kumar Aggarwal, Chandigarh (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/108,593

(22) Filed: Mar. 28, 2002

(65) Prior Publication Data

US 2003/0185274 A1 Oct. 2, 2003

(51) Int. Cl.$^7$ .............................................. G01K 11/06
(52) U.S. Cl. ......................... 374/130; 374/16; 374/18; 374/160; 374/161; 250/227.14
(58) Field of Search .................. 374/160, 161, 374/121, 130, 131, 136, 16, 17, 18; 359/139; 385/12; 116/206, 207; 250/227.11, 227.14

(56) References Cited

U.S. PATENT DOCUMENTS

| | | | | |
|---|---|---|---|---|
| 4,140,393 A | * | 2/1979 | Cetas ........................ 374/161 |
| 4,307,607 A | * | 12/1981 | Saaski et al. ................ 374/161 |
| 4,671,651 A | * | 6/1987 | Toyoda et al. ................. 356/44 |
| 4,672,218 A | * | 6/1987 | Chrisman et al. ............ 250/574 |
| 4,710,033 A | * | 12/1987 | Hirano et al. .................. 374/16 |
| 4,749,856 A | * | 6/1988 | Walker et al. ......... 250/227.11 |
| 4,785,174 A | * | 11/1988 | Hodges et al. ........... 250/338.1 |
| 4,906,107 A | * | 3/1990 | Luukkala ..................... 374/161 |
| 4,988,212 A | * | 1/1991 | Sun et al. .................... 374/161 |
| 5,036,194 A | * | 7/1991 | Hazel .................... 250/227.21 |
| 5,184,010 A | * | 2/1993 | Lequime ................ 250/227.21 |
| 5,273,950 A | * | 12/1993 | Fukaya et al. ............... 503/208 |
| 5,561,522 A | * | 10/1996 | Rapoport et al. .............. 10/108 |
| 5,754,722 A | * | 5/1998 | Melling ........................ 385/115 |
| 5,758,968 A | * | 6/1998 | Diebold ........................ 374/17 |
| 6,305,362 B1 | * | 10/2001 | Kitamura et al. ........... 359/241 |

FOREIGN PATENT DOCUMENTS

GB       2202941 A   * 10/1988   .......... G01N/25/04

* cited by examiner

Primary Examiner—Diego Gutierrez
Assistant Examiner—Lydia M. De Jesús
(74) Attorney, Agent, or Firm—Schiff Hardin & Waite

(57) ABSTRACT

The present invention provides an intensity modulated optical fiber temperature switching immersion probe for remote temperature monitoring and switching of an industrial process. The present invention also provides a method for remote sensing of temperature.

17 Claims, 1 Drawing Sheet

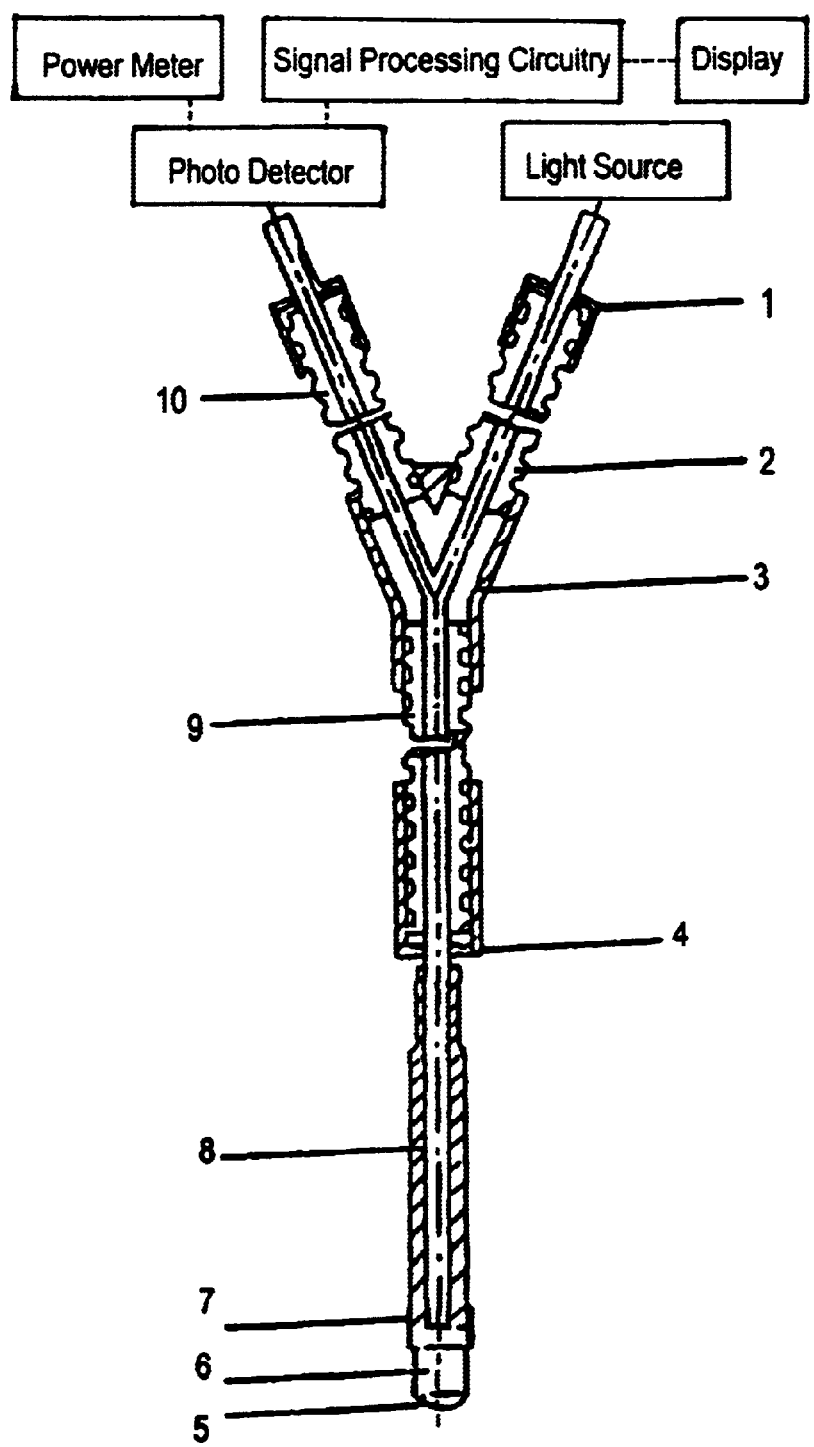
Figure

INTENSITY MODULATED FIBER OPTIC TEMPERATURE SWITCHING IMMERSION PROBE

FIELD OF INVENTION

The present invention relates to an intensity modulated fiber temperature optic switching immersion probe for remote temperature monitoring and switching of an industrial process. The present invention also provides a method for remote sensing of temperature.

BACKGROUND OF THE INVENTION

Conventionally, thermometers, thermocouples and pyrometers are used to measure and control the temperature, but they are not immune to hostile, corrosive and electromagnetically noisy environment. The novelty about this probe is the use of optical fibers in conjunction with a cell containing a chemical and resulting in a change of light level at its melting point. This arrangement overcomes the above mentioned problems effectively and provides the added advantage of remote monitoring. The cell is opaque to light at room temperature but becomes transparent at a given higher temperature enabling actuation of a relay to stop the heating process or raise an alarm. There is no electric signal being guided in this probe. It is only the light signal which is guided through optical fibers and is unaffected by the presence of electrical signals.

OBJECTS OF THE INVENTION

The main object of the present invention is to provide a reliable, durable, cost-effective and in-situ temperature switching fiber optic immersion probe, which overcomes most of the drawbacks present in conventional temperature probes as detailed above.

Another object of the present invention is to provide a method for remote sensing of temperature using this immersion probe.

Further object of the present invention is to provide an immersion probe for remote sensing temperature having a chemical that is non-toxic, non-inductive, non-conductive and non-corrosive.

Yet another object of the present invention is to provide an immersion probe for remote sensing of temperature in harsh working conditions.

SUMMARY OF THE INVENTION

The present invention relates to an intensity modulated fiber optic temperature switching immersion probe for remote temperature monitoring and switching of an industrial process. The present invention also provides a method for remote sensing of temperature. The present invention adopts a method wherein the melting of point of the chemical substance determines the switching mode for the device.

BRIEF DESCRIPTION OF THE DRAWING

The single drawing shows an intensity modulated fiber optic temperature switching immersion probe in cross section as well as associated equipment used therewith as block elements.

DETAILED DESCRIPTION OF THE INVENTION

Accordingly, the present invention provides an intensity modulated fiber optic temperature switching immersion probe for remote sensing of temperature, said device comprising:

(a) a Y-shaped optical fiber light guide encased in a metallic sleeve(8) terminated with a metallic end cap (1);
(b) the Y-guide having a source arm (2), detector arm (10), a Y-coupler (3), a common arm (9) and a common end cap(4);
(c) a light source is coupled to the source arm;
(d) a photo-detector is aligned to the detector arm;
(e) the Y-guide fits into the common end cap (4) of the metal sleeve;
(f) an evacuated cell (6) containing a chemical is attached to the common end of Y-guide as means for sensing temperature;
(g) the cell having a aluminum coating on the outside of the bottom surface forming a concave mirror;
(h) the cell is covered with a glass plate (5) on the upper side;
(i) the cell is further bonded and coupled to the metal sleeve by means of a metallic ring (7); and
(j) a power meter for the processing of electrical signal;

An embodiment of the present invention, wherein the Y-shaped optic guide is encased in a crush resistant metallic sleeve.

Yet another embodiment of the present invention, wherein the optical fiber is made of dielectric material that is non-corrosive, durable and immune to any Electro Magnetic Interference (EMI) and RFI.

Still another embodiment of the present invention, wherein the light source is white light.

Yet another embodiment of the present invention, wherein the detector arm that is coupled to a photo-detector is connected to signal processing electronic circuitry and an output display.

Still another embodiment of the present invention, wherein the chemical used undergoes phase transformation from solid to a liquid phase at its melting point.

Yet another embodiment of the present invention, wherein the chemical is selected from oxalic acid, sodium chloride, paraffin wax and preferably acetamide.

Further embodiment of the present invention, wherein the chemical is non-toxic, non-corrosive and non-inflammable.

Still another embodiment of the present invention, wherein in solid state the chemical is opaque to light and emits a fixed value of optical output and with the increased temperature the chemical melts and becomes transparent thus generating an increased optical output.

Yet another embodiment of the present invention, wherein the phase transformation at the melting point of the chemical increases the optical output that is used as a detector signal for actuation of alarm or relay.

Further embodiment of the present invention, wherein the length of the cell is twice the focal length of the concave mirror.

Still another embodiment of the present invention, wherein the optical signal propagation is secure and without any cross talk or interference problems.

Yet another embodiment of the present invention, wherein the optical signal is unaffected by the presence of electrical signals.

Still another embodiment of the present invention, wherein the said probe is used for remote sensing of temperature upto a distance of 1 km.

Further embodiment of the present invention, wherein the said probe at an increased temperature provides an increase of 6 times in the output signal over the signal at the room temperature.

Yet another embodiment of the present invention, wherein said optical probe operates at the melting temperature of the chemical that is in the range of 75–85° C. Further embodiment of the present invention, wherein said optical probe is used in monitoring temperature in hostile, inflammable, corrosive and electro-magnetically noisy environments, preferably in petrochemical industries and power plants.

The present invention also provides a method of sensing temperature through intensity modulation of light signal using an intensity modulated and remote sensing optic fiber temperature switching immersion probe, said method comprising the steps of:

(a) immersing the probe in a liquid container having a temperature below the melting point of the chemical;

(b) recording a fixed value of optical signal generated by the chemical in solid state and at the room temperature; and (c) detecting the maximum optical signal generated by the chemical at its melting point and in liquid phase;

(d) detecting the optical signal be means of a photo-detector;

(e) signal processing by means of an electronic circuitry; and (f) enabling actuation of a relay to stop the heating process or raise an alarm.

An embodiment of the present invention, a method wherein the liquid is selected from the group consisting of water, acetone, carbon tetrachloride and transformer oil. Another embodiment of the present invention, a method wherein the chemical is selected from selected from oxalic acid, sodium chloride, paraffin wax and preferably acetamide.

Still another embodiment of the present invention, a method wherein the chemical having a melting point in the range of 75–85° C.

Yet another embodiment of the present invention, a method wherein the optical signal propagation is secure and without any cross talk or interference problems.

Still another embodiment of the present invention, a method wherein the optical signal is unaffected by the presence of electrical signals.

Yet another embodiment of the present invention, a method wherein the said probe is used for remote sensing upto a distance of 1 km.

Still another embodiment of the present invention, a method wherein the said probe at an increased temperature provides an increase of 6 times in the output signal over the signal at the room temperature.

Yet another embodiment of the present invention, a method wherein the chemical substance that is opaque at room temperature becomes transparent at a given higher temperature enabling actuation of a relay to stop the heating process or raise an alarm.

The invention is further explained in the form of the following embodiments.

In the present invention a fiber optic temperature switching probe, which comprises a fiber optic Y-shaped light guide and a small cell containing a special chemical/which undergoes solid to liquid phase transformation at its melting point. The cell has a concave mirror on its lower side and a glass plate on the upper side. The chemical identified and experimented for this probe undergoes phase change at a temperature of 78–79° C. A small amount of the chemical is first transferred into cell and then it is evacuated and properly sealed. The cell is further bonded to a metal tube, which fits tightly on to the common end cap of the Y-guide. A metallic ring is used for coupling the cell to the metal tube. The Y-guide has two arms, termed as a source arm and the detector arm. A white light source is coupled to the source arm while the detector arm is aligned to a PIN photodetector. The electrical signal is processed and displayed by a powermeter.

In an embodiment of the present invention a suitable chemical has been identified and used to realize the cell for the temperature switching probe. Depending on the identification of a suitable chemical e.g. non-corrosive, non-inflammable, switch probes for different temperatures can be realized.

In another embodiment of the present invention, fiber optic light guides have been employed which are made of optical glass, a highly durable material being non-conductive and non-inductive in nature.

The sensing signal is in the form of intensity modulated light guided by the fiber. The signal propagation is secure without any cross talk or interference problems.

The optical fiber temperature switch probe comprises of an indigenously produced Y-shaped optical fiber light guide/bundle encased in a crush-resistant metallic sleeve with its ends properly terminated into metallic end caps. A few grams of the commercially available chemical in grainy form is first vacuum dried under clean conditions and then transferred into the cell made from a thin-walled glass test tube. The curved surface at the bottom of the test tube is given a reflective aluminum coating on the outside as to realize a concave mirror while the upper end is covered with a plane glass disc. Considering the image formation characteristics, the length of the cell is chosen to be twice the focal length of the concave mirror. Proper adhesive sealing is done to make the cell airtight.

With the help of a metallic ring, the cell is firmly coupled onto the common end cap of the Y-guide and in this situation, the common end rests on to the top glass cover of the cell.

When the probe is immersed in a liquid container at a temperature below the melting point of the chemical, there is a fixed value of the detector signal. The chemical begins to melt as the temperature reaches around 78–79° C. and thus more light reaches the detector resulting in an increased output signal. This continues till the chemical has melted completely and the detector signal has attained a maximum value which takes place at about 83° C. The probe provides typically 6 times increase in the output signal as compared to the room temperature stage. At any particular value of temperature in this range (75–85° C.) corresponding to the level of optical signal available, either an alarm signal could be generated or the process can be shut down automatically as to stop further heating of the liquid/solvent. Thus the probe can be used as a temperature switch e.g. to stop the process from further heating at any value of temperature in this range.

The probe facilitates sensing of temperature through intensity modulation of light signal. This modulation process is unaffected by a hostile and electrically noisy environment whereas the prior art has to be either properly shielded for gaining this immunity or protection. This is so because optical fibers are made from dielectric materials and therefore, they are both non-inductive and non-conductive in nature thereby bringing immunity to EMI/RFI. Also the basic raw material, optical glass from which fibers are made is quite durable and effectively withstands harsh and corrosive environments encountered in various application areas.

When the probe end is dipped into a liquid whose temperature is to be monitored, the optical signal reaching the detector depends on the transparency to light provided by the cell medium. As the temperature rises, the chemical starts melting beyond a point and transparency to light goes up rapidly thus increasing the detector signal. At a stage, the signal reaches its maximum value when the entire chemical has melted. This level of the signal can be used to raise an alarm or actuate a relay/switch to shut down or start a process at that maximum value of temperature thus working as a temperature switch probe.

This temperature switch probe has been experimented in the laboratory by dipping it in water and other solvents such as acetone, carbon tetrachloride, transformer oil etc to monitor their temperature. The temperature of water and other liquids is recorded with a mercury thermometer. There has been consistency and repeatability in the optical output with temperature within 1° C.

This probe could be beneficially used for starting/closing of a process in an industry. The process monitoring can be carried out remotely by extending the length of optical fiber arms of the bundle. It can be quite a durable and cost-effective device and the process monitoring operation can be made automatic. A comparison between the present probe and the conventional temperature measuring techniques/probes is given below:

COMPARISON CHART

| S. No | THERMO-METER | THERMO-COUPLE | PYROMETER | FIBER OPTIC PROBE |
|---|---|---|---|---|
| 1. | No point switching | No point switching | No point switching | Point switching |
| 2. | Immunity to EMI/ RFI and hostile / corrosive environments | Not immune to EMI/ RFI and hostile / corrosive environments | Not immune to EMI/ RFI and hostile / corrosive environments | Immunity to EMI/ RFI and hostile / corrosive environments |
| 3. | No remote sensing | No remote sensing | Remote sensing (few 10s of meters) | Remote sensing (upto a Km) |

ADVANTAGES

1. It can work for process industry applications where the environment is hostile and electrically noisy.
2. It can monitor the temperature remotely and the process can be made automatic.
3. A low cost and durable device.
4. The immersion probe is a simple and useful device, which can be employed in harsh environments for in-situ temperature switching applications from a remote location.

The drawing provided in the enclosed sheet indicates the configuration of the fiber optic temperature switching immersion probe. It basically comprises of a Y-shaped fiber optic bundle and a small cell made of a thin-walled glass test tube containing a chemical. The bottom surface of the test tube has been given a protective reflective aluminum coating on the outside for realizing as a concave mirror. The Y-shaped fiber optic bundle contains two arms: the source arm and the detector arm. A white light source is coupled to source arm employing suitable optics while the other arm is aligned to a PIN photo-detector.

The various parts of the probe have been labeled as under:
1. End Cap for Coupling to the Light Source
2. Source Arm
3. Y-Coupler
4. Common End Cap of the Fiber Bundle
5. Reflective Coating on Outside of the Bottom Surface of the Thin-Walled Glass Cell
6. Cell Containing the Chemical
7. Metallic Ring for Coupling Cell to the Common End Cap
8. Metallic Tube Tightly Fitting the Common End Cap
9. Common Arm
10. Detector Arm

What is claimed is:

1. An intensity modulated optic fiber temperature switching immersion probe device for remote sensing of temperature, said device comprising:

(a) a Y-shaped optical fiber light guide encased in a metallic sleeve terminated with a metallic end cap and a common end cap;
 (b) the Y-shaped light guide having a source arm, a detector arm a Y-coupler and a common arm;
 (c) a light source coupled to the source arm;
 (d) a photo-detector aligned to the detector arm;
 (e) the Y-shaped light guide fitting into the common end cap of the metallic sleeve;
 (f) an evacuated cell containing a chemical and being attached to an end of the common arm of Y-shaped light guide for sensing temperature;
 (g) the evacuated cell having a aluminum coating on an outside of a bottom surface forming a concave mirror;
 (h) the evacuated cell being covered with a glass plate on an upper side;
 (i) the evacuated cell being bonded and coupled to the metallic sleeve by a metallic ring; and
 (j) a power meter connected to said photo-detector for the processing of an electrical signal.

2. The device according to claim 1, wherein said metallic sleeve is a crush resistant metallic sleeve.

3. The device according to claim 1, wherein the optical fiber light guide is of dielectric material that is non-corrosive, durable and immune to any Electro Magnetic Interference (EMI) and RFI.

4. The device according to claim 1, wherein the light source is a white light.

5. The device according to claim 1, wherein the detector arm that is coupled to said photo-detector is connected to signal processing electronic circuitry and an output display.

6. The device according to claim 1, wherein the chemical in said evacuated cell undergoes phase transformation from solid to a liquid phase at its melting point.

7. The device according to claim 1, wherein the chemical in said evacuated cell is selected from the group consisting of: oxalic acid, sodium chloride, paraffin wax and acetamide.

8. The device according to claim 1, wherein the chemical in said evacuated cell is non-toxic, non-corrosive, non-conductive and non-inductive in nature and non-inflammable.

9. The device according to claim 1, wherein in solid state the chemical in said evacuated cell is opaque to light and emits a fixed value of optical output and with increased temperature the chemical melts and becomes transparent thus generating an increased optical output.

10. The device according to claim 1, wherein a phase transformation at a melting point of the chemical in said evacuated cell increases an optical output that is used as a detector signal for actuation of an alarm or relay.

11. The device according to claim 1, wherein a length of the evacuated cell is twice a focal length of the concave mirror.

12. The device according to claim 1, wherein optical signal propagation in said light guide is secure and without any cross talk or interference problems.

13. The device according to claim 1, wherein an optical signal in said light guide is unaffected by a presence of electrical signals.

14. The device according to claim 1, wherein said probe is used for remote sensing of temperature up to a distance of 1 km.

15. The device according to claim 1, wherein said probe operates to provide an increase of six times in an output signal an increased temperature over the output signal at room temperature.

16. The device according to claim 1, wherein said probe operates at a melting temperature of the chemical that is in the range of 75–85° C.

17. The device according to claim 1, wherein said probe is used in monitoring temperature in one of hostile, inflammable, corrosive and electro-magnetically noisy environments.

* * * * *